United States Patent
Markowz et al.

(10) Patent No.: US 9,051,526 B2
(45) Date of Patent: Jun. 9, 2015

(54) METHOD FOR MODIFICATION OF A METHANE-CONTAINING GAS STREAM

(75) Inventors: Georg Markowz, Alzenau (DE); Jürgen Erwin Lang, Karlsruhe (DE); Rüdiger Schütte, Alzenau-Hörstein (DE)

(73) Assignee: Evonik Degussa GmbH, Essen (DE)

( * ) Notice: Subject to any disclaimer, the term of this patent is extended or adjusted under 35 U.S.C. 154(b) by 276 days.

(21) Appl. No.: 13/526,482

(22) Filed: Jun. 18, 2012

(65) Prior Publication Data

US 2012/0318661 A1    Dec. 20, 2012

(30) Foreign Application Priority Data

Jun. 20, 2011    (DE) .......................... 10 2011 077 788

(51) Int. Cl.
*C10L 3/10* (2006.01)
*C01B 3/24* (2006.01)
*C10G 15/12* (2006.01)

(52) U.S. Cl.
CPC ... *C10L 3/10* (2013.01); *C01B 3/24* (2013.01); *C10G 15/12* (2013.01); *C01B 2203/0266* (2013.01); *C01B 2203/04* (2013.01); *C01B 2203/0861* (2013.01); *C01B 2203/1241* (2013.01)

(58) Field of Classification Search
CPC ..... C01L 3/10; C01B 3/24; C01B 2203/0266; C01B 2203/04; C01B 2203/0861; C01B 2203/1241; C10G 15/12
USPC .................................................. 204/170, 171
See application file for complete search history.

(56) References Cited

U.S. PATENT DOCUMENTS

| 2004/0157940 | A1 | 8/2004 | Dalton | |
|---|---|---|---|---|
| 2007/0282151 | A1* | 12/2007 | Richards | 585/733 |
| 2011/0163462 | A1 | 7/2011 | Lang et al. | |

FOREIGN PATENT DOCUMENTS

| EP | 2 169 035 A1 | 3/2010 |
|---|---|---|
| WO | WO 2010/028869 A1 | 3/2010 |
| WO | WO 2012/175279 A1 | 12/2012 |

OTHER PUBLICATIONS

English language translation of the Written Opinion of the International Searching Authority for international application, PCT/EP2012/059698, filed May 24, 2012.
English language translation of the International Preliminary Report on Patentability for international application, PCT/EP2012/059698, filed May 24, 2012.
English language translation of the International Search Report for international application, PCT/EP2012/059698, filed May 24, 2012.
Written Opinion for related international application, PCT/EP2012/059698, filed May 24, 2012.
English language abstract for EP 2 169 035 A1, listed as document B1 above.
English language translation of pp. 46-58 from Rutscher/Deutsch: Plasmatechnik—Grundlagen und Anwendungen—Eine Einführung [Plasma technology—Fundamentals and applications—An introduction], licensed edition for Carl Hanser Verlag, Munich, Vienna, VEB Fachbuchverlag Leipzig, chapter 1.2 "Erzeugung des Plasmazustandes" [Generation of the plasma state], 1984.
English language translation of pp. 241-247 from Rutscher/Deutsch: Plasmatechnik—Grundlagen und Anwendungen—Eine Einführung [Plasma technology—Fundamentals and applications—An introduction], licensed edition for Carl Hanser Verlag, Munich, Vienna, VEB Fachbuchverlag Leipzig, chapter 1.2 "Erzeugung des Plasmazustandes" [Generation of the plasma state], 1984.
English language translation of "Teil 3: Wasserstoff-Speicher" from ENERGIE Perspektiven, (Jan. 1, 2008).
"Hydrogen-Enriched Natural Gas"; (Jan. 1, 2009), A paper by National Grid and Atlantic Hydrogen Inc. for Gas Industry Executives, Utility Regulators, Policy Makers and Energy Administrators.
Rutkowsky, et al., "Zur Kinetik der plasmachemischen Methan-Umsetzung in einer stillen elektrischen Entladung," *Beitr. Plasmaphys.* 23(2):181-191 (1983).
Ulmann's Encyclopedia of Industrial Chemistry, 5th edition, vol. A1 pp. 115-116 and vol. A20 pp. 428-434 (1992).

* cited by examiner

*Primary Examiner* — Kishor Mayekar
(74) *Attorney, Agent, or Firm* — Law Office of: Michael A. Sanzo, LLC

(57) ABSTRACT

A method for modification of a methane-containing gas stream, comprising the steps of: i) withdrawal of at least one substream from a methane-containing gas stream; ii) treatment of the substream with an electrically generated plasma, generating a modified gas composition which comprises a lower fraction of methane than the methane-containing gas stream used and iii) return of modified gas composition into the methane-containing gas stream. This method makes possible the storage of excess power in a natural gas line grid.

20 Claims, No Drawings

METHOD FOR MODIFICATION OF A METHANE-CONTAINING GAS STREAM

CROSS REFERENCE TO RELATED APPLICATIONS

The present application claims priority to German Application, DE 10 2011 077 788.1 filed on Jun. 20, 2011.

FIELD OF THE INVENTION

The present invention relates to a method for modification of a methane-containing gas stream.

BACKGROUND OF THE INVENTION

The expansion of renewable energies (REs) having fluctuating generation profiles that can only be controlled inefficiently poses increasing challenges for energy infrastructures. In addition to the grid expansion and approaches for load management, the provision of suitable storage capacities is required. In this case, not only high-dynamic stores for stabilizing power grids, but also technologies for taking up large excesses of REs come into consideration. In the latter case, currently, in addition to the established pumped-storage plants, especially compressed-air storage plants and chemical storage in the form of hydrogen are coming into consideration and pursued in research and development. In the case of hydrogen, in addition to the requirement for drastic decrease of capital costs with respect to components, and for increase in efficiency in the conversion steps, there is the question of a suitable infrastructure for storage, distribution and use of the hydrogen.

In recent years, there have been numerous approaches for a hydrogen infrastructure. A differentiation must be made between the approaches in which hydrogen is stored, transported and utilized separately. A disadvantage in this case is the considerable expenditure for introducing a separate infrastructure. Especially the example of hydrogen mobility shows that there are more than insignificant obstacles during introduction, if such concepts are based on widespread availability of the energy carrier. Also, the frequently favoured utilization of central subterranean cavern stores for the storage of hydrogen means a considerable entry hurdle, owing to the high initial capital cost. Not least, it would seem to be necessary for the users to install new equipment.

Consequently, there has been much work concerned with utilizing the existing natural gas infrastructures for storage and transport of regeneratively generated hydrogen. In the context of the EU-funded project NaturalHy, the technical and in particular safety-related feasibility of feeding hydrogen into natural gas pipelines has been studied and demonstrated. Relatively high, and especially fluctuating, fractions of hydrogen in the natural gas, however, lead to problems in the end equipment, since much end equipment only permits a comparatively narrow range in what is termed the Wobbe index and a broadening of the range would cause complex additional installations on the end equipment. The Wobbe index of a flammable gas as specified in DIN 51857 is calculated from the heating value and the relative density of the gas and describes the heat output achieved in the combustion of the gas in a nozzle burner. In the Netherlands, for example, the Wobbe index must be maintained within a range of approximately 1 $MJ/m^3$. However, even at low fractions of approximately 5% by volume the addition of hydrogen leads to departure from the range. Direct feeding of hydrogen into conventional gas grids which are used, for example, for distribution of natural gas, is therefore possible only to a limited extent.

An alternative possibility for the practical use of relatively large amounts of power originating from REs is the conversion of hydrogen and carbon monoxide or carbon dioxide to methane which hereinafter will also be termed methanation. In this case, there is in principle no restriction with respect to the amount of power fed in. On the other hand, it must be noted that methanation, in addition to hydrogen generation, requires a considerable expenditure in terms of apparatus and is accompanied by further energy losses. For instance, methanation proceeds in a gas-phase process at about 200 to 300° C. at excess pressure. The reaction is equilibrium-limited, and so a more or less extensive work-up and cycling of the process gases is required. In addition, the reaction is highly exothermic. The heat of the reaction generally—in particular in the case of relatively large plants—cannot be utilized, or can be utilized only in part. Therefore, the in any case already low efficiency is further reduced in the overall conversion chain.

SUMMARY OF THE INVENTION

In the light of the prior art, it is now the object of the present invention to provide a technically improved method for the use, in particular for storage or practical use of electrical energy, which method is not burdened with the disadvantages of conventional methods.

Thus, electrical energy, in particular excess renewable energy, should be converted by a suitable method into a storable form by the method according to the invention.

In particular, it is an object of the present invention to find ways which make it possible to reduce, compared with the prior art, the expenditure in terms of apparatus and operations on storage, transport and utilization of preferably regeneratively generated hydrogen.

In addition, the method should be able to be carried out in a scalable manner, such that relatively small plants, which can also be made up in a modular manner, can be used for carrying out the storage. In addition, decentralized operation of the plants should be possible.

The method, in addition, should have an efficiency as high as possible. In addition, the method according to the invention should be suitable for operation using the conventional and largely existing infrastructure.

In addition, the method according to the invention should make available valuable chemicals which arise as additional by-products in the method.

In addition, the method should be suitable to be carried out as simply and cheaply as possible.

Furthermore, the method should be suitable to be carried out with as few method steps as possible, wherein the same should be simple and reproducible.

In addition, carrying out the method should not be associated with a hazard to the environment or human health, so as one could substantially dispense with the use of substances or compounds hazardous to health which could be associated with disadvantages for the environment.

In addition, the method should be suitable for use independently of the available natural gas quality.

These objectives, and also further objectives not explicitly stated, which however can be readily derived or deduced from the relationships discussed at the outset herein, are achieved by a method in which a substream of a methane-containing gas stream is treated with a plasma in such a manner that some of the methane is reacted to form hydrogen and higher hydrocarbons and the treated substream gains a higher heating value than the methane-containing gas stream.

DESCRIPTION OF THE INVENTION

The present invention therefore relates to a method for modification of a methane-containing gas stream, which comprises the steps:
i) withdrawal of a substream from a methane-containing gas stream,
ii) treatment of the substream with an electrically generated plasma, generating a modified gas composition which comprises a lower fraction of methane than the methane-containing gas stream and
iii) return of modified gas composition into the methane-containing gas stream.

It is possible thereby in a surprising and non-predictable manner to provide a method of the type set forth above, which method has a particularly good property profile and which, in particular, is not burdened with the disadvantages of conventional methods.

A methane-containing gas stream, according to the present invention, is taken to mean a gas stream which, in addition to methane, can also comprise other gaseous compounds. The methane-containing gas stream used preferably has a methane fraction of at least 50% by volume, particularly preferably at least 60% by volume, and in particular at least 80% by volume. Preferably, the methane-containing gas stream is a natural gas, a town gas or a biogas, particularly preferably a natural gas. Particularly preferably, the methane-containing gas stream is a natural gas which flows through a pipeline or a natural gas distribution line.

In the method according to the invention, preferably at most 80%, particularly preferably at most 60%, and in particular at most 40%, of the methane-containing gas stream is removed as substream.

The substream that is removed can be stored, in particular temporarily stored, bypassed and/or pretreated before the treatment with a plasma.

In the method according to the invention the substream that is removed is treated with an electrically generated plasma. The expression electrically generated plasma designates according to the invention an electrically or electromagnetically generated gas discharge. The electrically generated plasma can be a glow discharge which proceeds far removed from the thermal equilibrium (nonequilibrium plasma of high electron temperature), or a gas discharge which is close to thermal equilibrium (quasi isothermal plasma). Methods for plasma generation are known to those skilled in the art from Rutscher/Deutsch: Plasmatechnik—Grundlagen and Anwendungen—Eine Einführung [Plasma technology—Fundamentals and applications—An introduction], licensed edition for the Carl Hanser Verlag, Munich, Vienna, VEB Fachbuchverlag Leipzig, 1984, chapter 1.2 "Erzeugung des Plasmazustandes" [Generation of the plasma state], pages 46 to 58.

The plasma treatment can in principle be performed at any desired pressure. For the treatment, the pressure can be reduced in the substream that is removed. Preferably, however, the method is carried out at a pressure which differs only slightly from the pressure of the methane-containing gas stream, so that no complex pressure adaption or compression is required for returning it.

Preferably, the plasma is generated by a dielectric barrier discharge (DBD). Devices for generating a dielectric barrier discharge in a gas stream are known to those skilled in the art and are commercially available, for example for producing ozone from oxygen. The generation of a dielectric barrier discharge in methane with formation of ethane is described in Beitr. Plasmaphys. 23 (1983) 181-191. The treatment with a plasma generated by a dielectric barrier discharge is preferably carried out at a pressure of less than 50 bar, particularly preferably less than 10 bar, and in particular less than 1.2 bar. The dielectric barrier discharge can be operated with low frequency alternating current, for example with the grid frequency of 50 Hz. For increasing the throughput, operations can be carried out at higher frequencies up to 100 GHz. Preferably, operations are carried out in the technically usual frequency ranges around 13 MHz, 900 MHz or 2.4 GHz. Geometry and operating conditions of the dielectric barrier discharge are preferably selected in such a manner that the product of the gap width of the gas space between the electrodes and the gas pressure is in the range from $0.75 \times 10^{-3}$ to $7.5 \times 10^3$ mm·bar.

In an alternative preferred embodiment, the plasma is generated by an arc discharge. Devices for generating an arc discharge in a gas stream are known to those skilled in the art from production methods for acetylene and are described in Ullmann's Encyclopedia of Industrial Chemistry, 5th edition, Vol. A1, 115-116 and Vol. A20, 428-434. The arc discharge can be operated with direct current or alternating current. In the method according to the invention, the arc formed by the gas discharge is preferably subjected to at least some of the substream. In the method according to the invention, the velocity of the substream and the energy input via the arc discharge are preferably selected in such a manner that a significantly lower mass-related energy input results than in the known methods for producing acetylene. In a preferred embodiment, a part of the substream is passed through an arc discharge and immediately thereafter the resulting hot gas is quenched chemically and thermally by mixing with the rest of the substream. In another preferred embodiment, a plasma is generated by an arc discharge in a hydrogen stream and the substream is treated with the plasma thus generated. For generating the arch discharge in the hydrogen stream, preferably a plasma burner is used and the hydrogen plasma jet generated thereby is directed into the substream.

In a further embodiment, instead of an arc discharge, the plasma can also be generated by a spark discharge, a radio frequency discharge or a high frequency discharge, e.g. a microwave discharge.

The substream can also be treated several times with an electrically generated plasma, wherein dielectric barrier discharges, arc discharges, spark discharges, radio frequency discharges and high frequency discharges can also be combined with one another.

In the plasma treatment, methane is reacted to form higher hydrocarbons and hydrogen, in particular to form ethane and hydrogen, in accordance with the reaction equation:

$$2CH_4 \rightarrow C_2H_6 + H_2$$

The gas composition modified by the plasma treatment therefore preferably has a higher content of hydrogen and ethane than the substream that is withdrawn. In addition to ethane, higher hydrocarbons such as propane and butane can also be obtained. Depending on the process conditions of the plasma treatment of the substream, in particular at a higher energy input and high plasma temperatures, in addition, unsaturated hydrocarbons, such as ethene, propene and acetylene, and also carbon black can also be formed. The gas composition modified by the plasma treatment therefore particularly preferably also has a higher content of propane, ethene and/or propene than the substream that is removed. If the methane-containing gas stream contains oxygen, water or carbon dioxide, the gas composition modified by the plasma treatment, in addition, can contain an increased fraction of carbon monoxide.

The electrical energy used for generating the plasma can be adapted dynamically in accordance with the supply of electrical energy. Preferably, the electrical energy originates from excess power which has particularly preferably been obtained from renewable energies. Using the method according to the invention, an oversupply of power which, for reasons of load bearing capacity of the power grid or of insufficient power demand at the time of feeding in, cannot be fed into the power grid, can expediently be stored in the form of chemical energy. Preferably, the plasma treatment according to the invention is designed to be controllable, wherein the control can be, in particular, dependent on the power supply.

According to the available energy and size of the substream that is withdrawn, the composition of the modified gas composition can fluctuate greatly, wherein the methane content, based on the methane-containing gas used, decreases. In addition, the level of the methane-containing gas stream can fluctuate, so that after return of the modified gas composition into the methane-containing gas stream, fluctuations result in the composition thereof. Generally, therefore, average values are obtained, wherein the conversion rate can frequently be selected so as to be relatively low, without the plant becoming uneconomic. According to a particular embodiment, observed for a year, the fraction of methane in the modified gas composition can be at least 20% by volume, preferably at least 40% by volume, and particularly preferably at least 60% by volume. The increase in the content of higher hydrocarbons in the modified gas composition can be, for example, in the range from 0.01 to 40% by volume, preferably 1 to 30% by volume, and particularly preferably 5 to 20% by volume. These values apply before adjustment of the Wobbe index to a predetermined value, wherein these data represent a mean value which must be determined over a year.

It may further be arranged that the plasma treatment drives the chemical reaction of the methane further in the direction of the next-higher hydrocarbons depending on the desired target values of the Wobbe index. In this case, the reaction of methane can be controlled, in particular, in dependence on the highly fluctuating electrical energy, in such a manner that in the case of a high supply of renewable energies, more methane is reacted, and in the case of a low supply, little methane is reacted.

If deposits, for example of soot or tar, form in the device in which the plasma treatment is carried out, they may be removed by generating in the device a plasma in an oxygen-containing gas, for example air. Preferably, for this purpose, the treatment of the substream is interrupted or the deposits are removed in a period in which no substream is to be treated.

After the plasma treatment, the modified gas composition is returned completely or in part into the methane-containing gas stream. Preferably, at least 20% by volume, particularly preferably at least 60% by volume, and in particular at least 80% by volume, of the modified gas composition is returned into the methane-containing gas stream. Before the modified gas composition is returned into the methane-containing gas stream, components interfering with gas transport in a line, such as soot or higher hydrocarbons, can be removed by suitable methods, such as filtration, condensation or gas scrubbing. If the pressure of the withdrawn substream has been reduced before or during the treatment with an electrically generated plasma, the modified gas composition is preferably brought to a higher pressure using a compressor, before it is returned into the methane-containing gas stream.

The modified gas composition generated by treatment with a plasma can be stored, in particular temporarily stored, bypassed and/or after-treated, before it is returned completely or in part into the methane-containing gas stream.

Preferably, upon return into the methane-containing gas stream the modified gas composition has a Wobbe index similar to that of the methane-containing gas stream. Preferably, the ratio of the Wobbe index of the modified gas composition to the Wobbe index of the methane-containing gas stream is in the range from 0.7:1 to 1:0.7, particularly preferably in the range from 0.85:1 to 1:0.85, and in particular in the range from 0.95:1 to 1:0.95.

A similar Wobbe index of modified gas composition and methane-containing gas stream can be achieved by a low conversion rate of methane during the plasma treatment. In order to achieve a similar Wobbe index of modified gas composition and methane-containing gas stream independently of the conversion rate of methane, however, preferably an additional gas is added to the modified gas composition before returning it, preferably a gas which is not flammable or has a lower heating value than the methane-containing gas stream. It is possible to ensure thereby in the method according to the invention that the higher heating value of the modified gas composition, as compared with the withdrawn substream, does not lead to a great change of the Wobbe index in the methane-containing gas stream, which could be disadvantageous for the end user, owing to the narrow acceptable range of the Wobbe index of the end user equipment. For lowering the Wobbe index to the value predetermined by the operator of the gas line, preferably, an additional gas is added which contains oxygen, nitrogen, carbon dioxide, carbon monoxide and/or hydrogen. The additional gas can, in addition, also contain water vapour, wherein the content of water vapour should be kept sufficiently low that after return of the modified gas composition into the methane-containing gas stream, the intended dew point is not exceeded.

Preferably, oxygen and nitrogen are added in the form of air. The excessively high Wobbe index in the case of a high methane conversion rate can be lowered to the required value by an adequate admixture of air. At a correspondingly low conversion rate of methane in the plasma treatment, such low amounts of air are required for this purpose that the permissible maximum value of oxygen (DVGW [German Technical and Scientific Association for Gas and Water] guidelines: 4%) in natural gas lines is not exceeded.

When the methane-containing gas stream is a natural gas, the additional gas added can also be biogas which is preferably not purified, or purified only in part, and has a lower Wobbe index than the natural gas.

In a preferred alternative embodiment, water can also be electrolyzed to hydrogen which is then added to the modified gas composition, preferably to a natural gas, as additional gas for adjusting the Wobbe index. Preferably, surplus power is used not only for the plasma treatment but also for the electrolysis, wherein the distribution of the power to the plasma treatment and the electrolysis is selected in such a manner that the Wobbe index, after addition of the hydrogen generated by electrolysis, corresponds to the Wobbe index of the methane-containing gas stream. In contrast to the direct addition of pure hydrogen to natural gas lines which, even in a range of a few percent volume fraction of hydrogen lead to a considerable reduction of the Wobbe index of the natural gas, in the case of such a coupling of plasma treatment and electrolysis, relatively large amounts of hydrogen can be fed into a natural gas line maintaining a predetermined Wobbe index. The design and operation of the combination of electrolysis and plasma treatment can in this case be simply adapted to the local natural gas quality and, even after startup, to fluctuating natural gas qualities. In addition, some of the "surplus power" goes into enriching the heating value of natural gas, so that for the same "storage performance" the specifically expensive electrolysis can be built to be smaller than in the case of pure storage by electrolytically generated hydrogen.

In a preferred embodiment of the method according to the invention, the Wobbe index of the modified gas composition is measured continuously or intermittently and the amount of added additional gas is controlled by the measured value. Suitable instruments for continuous or intermittent measurement of the Wobbe index of a gas mixture are commercially available, for example under the name CWD2005 calorimeter from Union Instruments or under the name RHADOX™ analyser from AMS Analysen-, Mess- and Systemtechnik.

As an alternative to addition of the additional gas after the plasma treatment, the additional gas can also be added before or during the plasma treatment. In a preferred embodiment of the addition of an additional gas during the plasma treatment, an arc discharge in a hydrogen stream generates a plasma and the substream is treated with the plasma thus generated. Preferably, for generation of the plasma in this case a so called plasmatron is used, as is described in Rutscher/Deutsch: Plasmatechnik—Grundlagen und Anwendungen—Eine Einführung [Plasma technology—Fundamentals and applications—An introduction], licensed edition for the Carl Hanser Verlag, Munich, Vienna, VEB Fachbuchverlag Leipzig, 1984, chapter 1.2 "Erzeugung des Plasmazustandes" [Generation of the plasma state], on pages 241 to 247. The hydrogen stream used for this purpose is preferably generated by electrolysis of water.

In a further preferred embodiment, at least one component is selectively separated from the modified gas composition. Preferably, this component is hydrogen, carbon monoxide, ethene, propene or propane. Two or more components can also be separated apart or jointly. The separation of the component can proceed using all separation methods known for this purpose to those skilled in the art and preferably proceeds using a membrane method. In this connection it must be stated that complete separation is not necessary, but the degree of separation can be optimized on the basis of economic considerations. For example, hydrogen can be separated for hydrogenations, or ethene and/or propene for chemical syntheses. In a preferred embodiment of the method according to the invention, a hydrogen stream is generated by selective separation of hydrogen from the modified gas composition, in this hydrogen stream a plasma is generated by an arc discharge and the substream is treated with the plasma thus generated. Preferably, the gas volume of the modified gas composition is reduced by the selective separation of components by at most 60% by volume, particularly preferably by at most 40% by volume, and in particular by at most 20% by volume.

If the methane-containing gas stream is a natural gas in a natural gas grid, as an alternative these components can also be withdrawn from the natural gas grid at any desired withdrawal points. For instance, it would be simpler, for example, (in particular feasible in relatively small plants) to separate hydrogen from the natural gas grid at the location of use than generating it by reforming natural gas. Alternatively, ethane, ethene, propane and/or propene could be isolated as LPG. During the withdrawals, maintaining the Wobbe index in the natural gas line may need to be considered. On the depletion of hydrogen, the Wobbe index of the depleted gas mixture can increase, whereas on withdrawal of higher hydrocarbons, the Wobbe index can fall. In order to keep the Wobbe index constant, therefore, in the case of a withdrawal site remote from the plasma treatment, it can be provided that not only hydrogen but also a valuable material, such as, for example, ethene or propene is withdrawn. Alternatively, hydrogen can be withdrawn and a different gas added at the withdrawal site, which additional gas is not flammable, such as, for example, nitrogen, or has a lower Wobbe index than the natural gas.

Using the method according to the invention, surplus electrical energy, which preferably originates from renewable energies, such as wind power or photovoltaics, for example, may be converted into a storable form and stored, for example, in an existing infrastructure for natural gas storage.

The method has a high efficiency and can be operated in a decentralized manner in standardized small plants, e.g. in the form of compact plants in a container structure. Preferably, the method is operated in a plant in a container structure having an integrated infrastructure, as described in WO 2010/028869.

In addition, the method can be carried out using relatively few method steps, which are simple and reproducible. The method according to the invention can thereby be carried out simply and inexpensively.

In addition, carrying out the method is not associated with hazard to the environment or to human health, and so the use of substances or compounds hazardous to health which could be associated with disadvantages for the environment, can be substantially dispensed with. The method according to the invention may even be operated in an emission-free manner.

In addition, what is termed the Wobbe index can be adjusted in the modified methane-containing gas stream in such a manner that it corresponds to the value in a standard natural gas line.

In addition, valuable chemicals which are produced as additional by-products in the method can be made available with the method according to the invention.

The method according to the invention is, in addition, independent of the local natural gas quality, if natural gas is used as methane-containing gas stream.

In addition, by using electrical power which cannot be used for other purposes and, e.g. originates from renewable energies, the heating value of natural gas can be increased by the generation of hydrogen and ethane from methane, and so less gas is necessary for generating a defined amount of energy from this gas, compared with the untreated natural gas. Natural gas can be saved thereby.

In comparison with a combination of electrolytic hydrogen generation and methanation, the capital costs for the method according to the invention are noticeably lower.

In addition, the method according to the invention has markedly lower efficiency losses than a methanation, based on the same energy stored. This is true, in particular, when the carbon dioxide necessary for the methanation is not available from flue gases or biogas plants in a relatively high concentration, but must be obtained from the air. In addition, the methanation requires high temperatures, wherein the waste heat produced in the methanation may only be utilized in a complex manner, which is usually uneconomic.

The plasma treatment of the method according to the invention can—in contrast to the gas-phase process of methanation—be operated relatively well dynamically, that is to say may be flexibly and variably adapted to the power supply. When the method according to the invention is coupled to an electrolysis of hydrogen, the generation of hydrocarbon-hydrogen mixtures having a higher heating value and Wobbe index proceeds simultaneously with the production of electrolysis hydrogen. Temporary storage of the hydrogen is therefore not required. In contrast thereto, in the case of methanation which is preferably carried out continuously for economic operation of the plant, that is to say decoupled in time from the electrolysis, means for temporary storage of hydrogen are required, which generally also requires additional expenditure in terms of apparatus and energy for compressing the hydrogen.

Both for the electrolysis and for the plasma treatment the specific capital requirement is less than in the case of high-temperature methanation. Consequently, small decentralized units, e.g. container units, having a high standardization potential, are simpler to present in terms of economics.

Further advantages compared with the variant of methanation of hydrogen are a possible reduction of emissions, since a hydrogen fraction in the methane-containing gas stream leads to a decrease of $NO_x$ emissions upon combustion.

By the use of biogas as methane-containing gas stream, or the addition of biogas as additional gas, the conditioning of biogas to the required feed quality may be simplified. Biogas may be enriched by way of plasma treatment directly, or in combination with natural gas which is available on the site of the planned feeding-in, in such a manner that workup by methods of absorption, adsorption and/or membrane methods before feeding into the natural gas grid is unnecessary, or the workup effort is at least markedly decreased.

What is claimed is:

1. A method for modifying a methane-containing gas stream, said method comprising the steps:
   i) withdrawing a substream from said methane-containing gas stream;
   ii) treating said substream with an electrically generated plasma, thereby generating a modified gas composition which comprises a lower fraction of methane than said methane-containing gas stream; and
   iii) returning at least part of said modified gas composition into said methane-containing gas stream.

2. The method of claim 1, wherein the methane-containing gas stream is a natural gas.

3. The method of claim 1, wherein the methane-containing gas stream is a biogas.

4. The method of claim 1, wherein the modified gas composition has a higher content of hydrogen and ethane than the withdrawn substream.

5. The method of claim 1, wherein the modified gas composition has a higher content of a compound selected from the group consisting of propane, ethene and propene than the substream that is removed.

6. The method of claim 1, wherein an additional gas is added to the modified gas composition before it is returned.

7. The method of claim 6, wherein the additional gas comprises a compound selected from the group consisting of oxygen, nitrogen, carbon dioxide, carbon monoxide and hydrogen.

8. The method of claim 6, wherein the additional gas comprises air.

9. The method of claim 6, wherein the additional gas comprises hydrogen from an electrolysis of water.

10. The method of claim 6, wherein the methane-containing gas stream is a natural gas and the additional gas is a biogas.

11. The method of claim 6, wherein a Wobbe index of the modified gas composition is measured continuously or intermittently and the additional gas is added in an amount controlled by the measured value.

12. The method of claim 1, wherein the Wobbe index of the modified gas composition to the Wobbe index of the methane-containing gas stream has a ratio in the range from 0.85:1 to 1:0.85.

13. The method of claim 1, wherein at least one component is selectively separated from the modified gas composition before it is returned.

14. The method of claim 13, wherein a compound selected from the group consisting of hydrogen, carbon monoxide, ethene, propene and propane is selectively separated.

15. The method of claim 1, wherein the plasma is generated by power from renewable energies.

16. The method of claim 1, wherein the electrical energy used for generating the plasma is adjusted depending on excess power supply.

17. The method of claim 1, wherein the plasma is generated in the substream by a dielectric barrier discharge.

18. The method of claim 1, wherein the plasma is generated by an arc discharge in a hydrogen stream and the substream is treated with the plasma thus generated.

19. The method of claim 18, wherein the hydrogen stream is generated by electrolysis of water.

20. The method of claim 18, wherein the hydrogen stream is generated by selective separation of hydrogen from the modified gas composition.

* * * * *